United States Patent [19]

Pakusch et al.

[11] Patent Number: 5,962,554
[45] Date of Patent: Oct. 5, 1999

[54] USE OF POLYMERS AS ASSISTANTS IN THE DRYING OF AQUEOUS POLYMER DISPERSIONS

[75] Inventors: Joachim Pakusch, Ludwigshafen; Bernhard Schuler, Mannheim; Walter Mächtle, Ludwigshafen; Roland Baumstark, Neustadt, all of Germany

[73] Assignee: BASF Aktiengesellschaft, Ludwigshafen, Germany

[21] Appl. No.: 08/732,725

[22] Filed: Oct. 18, 1996

[30] Foreign Application Priority Data

Oct. 24, 1995 [DE] Germany ............................ 195 39 460
Jan. 24, 1996 [DE] Germany ............................ 196 02 391

[51] Int. Cl.$^6$ ................................. B01D 1/18; C08L 41/00
[52] U.S. Cl. .............................. 523/342; 524/3; 524/458; 524/460; 524/521; 524/522; 524/523; 525/201; 525/212; 525/217; 525/218; 528/480; 528/481
[58] Field of Search ..................................... 524/458, 521, 524/460, 522, 523, 3; 525/201, 212, 217, 218; 528/480, 481; 523/342

[56] References Cited

U.S. PATENT DOCUMENTS

| | | | |
|---|---|---|---|
| 3,965,032 | 6/1976 | Gibbs et al. ............................ | 252/306 |
| 4,698,161 | 10/1987 | Hansen ................................... | 210/701 |
| 4,891,401 | 1/1990 | Huybrechts et al. .................. | 524/807 |
| 5,025,040 | 6/1991 | Crema et al. ............................ | 524/5 |
| 5,462,978 | 10/1995 | Penzel et al. ........................... | 524/3 |
| 5,604,272 | 2/1997 | Penzel et al. ........................... | 524/3 |

*Primary Examiner*—Judy M. Reddick
*Attorney, Agent, or Firm*—Oblon, Spivak, McClelland, Maier & Neustadt, P.C.

[57] ABSTRACT

Polymers composed of at least >80% by weight of monomers of the formula

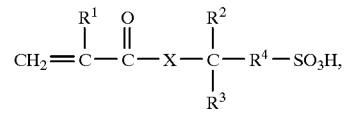

where $R^1$, $R^2$ and $R^3$ are each $C_1$–$C_3$-alkyl, $R^4$ is $C_1$–$C_5$-alkyl and X is O or NH, are used as assistants in the drying of aqueous polymer dispersions and, in the case of a weight average relative molecular weight of from 5000 to 35,000, additionally as protective colloid for the preparation of aqueous polymer dispersions by the free radical aqueous emulsion polymerization method.

31 Claims, No Drawings

USE OF POLYMERS AS ASSISTANTS IN THE DRYING OF AQUEOUS POLYMER DISPERSIONS

The present invention relates to the use of polymers I which, in polymerized form, are composed of
from >80 to 100% by weight of at least one monomer of the formula I or salts thereof (monomer a)

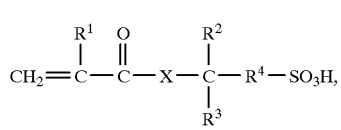

where $R^1$, $R^2$, $R^3$ independently of one another, are each
H or
$C_1$–$C_3$-alkyl,
$R^4$ $C_1$–$C_5$-alkylene and
X is O or NH
and
from 0 to <20% by weight of at least one monomer capable of free radical copolymerization (monomer b)
as assistants in the drying of aqueous dispersions of polymers II which differ from the polymers I.

The present invention also relates to the polymer powders which are obtained in the drying and are redispersible in water, and the use of these powders (for example as additives in mineral binders or as binders for synthetic resin renders) and dispersions of polymers II, which dispersions are required for the preparation of the powders.

Aqueous polymer dispersions are generally known. They are systems which essentially contain spherical coils of intertwined polymer chains (ie. polymer particles) as the disperse phase. As in the case of polymer solutions on evaporation of the solvent, aqueous polymer dispersions have the potential to form polymer films when the aqueous dispersing medium has evaporated, and they are therefore used in particular as binders, adhesives and coating materials. Of key importance for the properties of aqueous polymer dispersions is the size of the polymer particles present therein as the disperse phase. In particular, properties such as the viscosity of the aqueous polymer dispersion or the gloss of its films are dependent on the diameter of the dispersed polymer particles or, more precisely, on the diameter distribution function of the dispersed polymer particles (for the identical polymer, films of small polymer particles generally have higher gloss; a broad diameter distribution results, as a rule, in a lower viscosity of the aqueous polymer dispersion; dispersions of small polymer particles have, as a rule, a greater pigment binding capacity, etc.

However, one disadvantage of the application form aqueous polymer dispersion is that, as a rule, it is not prepared and used in the same place. Its transport from the place of preparation to the place of use implies, however, the additional transport of the dispersing medium water, which is readily available everywhere, in addition to transport the polymer, which ultimately is essentially the only constituent of the polymer film. Furthermore, aqueous polymer dispersions can be added to mineral binders to modify the latter only at the place of use, since said binders otherwise cure before use.

A desirable form of any aqueous polymer dispersion is therefore that of its polymer powder which redisperses when water is added.

In principle, polymer powders which are redispersible on addition of water are obtainable by drying the aqueous polymer dispersions. Examples of such drying processes are freeze drying and spray drying. The latter method, in which the polymer dispersion is sprayed in a warm air stream and dried, is particularly advantageous for producing large amounts of powders. The air used for drying and the sprayed dispersion are preferably passed cocurrently through the dryer, (cf. for example EP-A 262326 or EP-A 407889).

However, the disadvantage of the polymer powders produced by drying aqueous polymer dispersions is that their redispersibility on addition of water may in general not be completely satisfactory insofar as the polymer particle diameter distribution resulting during redispersion is as a rule different from that in the aqueous starting dispersion (primary particle diameter distribution).

This is due to the fact that aqueous polymer dispersions do not form thermodynamically stable systems. Rather, the system tends to reduce the polymer/dispersing medium interface by combining small primary particles to form larger secondary particles (e.g. specks, coagulum), which, in the state of dispersed phase in an aqueous medium, can be prevented for a relatively long time by adding dispersants. During drying, however, the separating effect of the dispersants is frequently not always efficient when irreversible formation of secondary particles takes place to a certain extent, ie. the secondary particles are retained as such on redispersiom and impair the performance characteristics of the aqueous polymer dispersions obtainable in the course of the redispersion.

It has long been known that there are substances which, when added to aqueous polymer dispersions, reduce the phenomenon of irreversible secondary particle formation during drying. These substances are known collectively by the term drying assistants. They are often known in particular as spray assistants, as spray drying promotes the formation of irreversible secondary particles to a particular extent. At the same time, they generally reduce, during spray drying, the formation of polymer coating which remains adhering to the dryer wall, and thus result in an increase in the powder yield.

EP-A 629650 discloses that polymers (Polymers III) which are obtainable by free radical polymerization, in an aqueous medium, of monomer mixtures comprising from 15 to 80% by weight of at least one monomer of the general formula I and from 20 to 85% by weight of monomers capable of free radical copolymerization suitable as spray assistants in the spray drying of aqueous polymer dispersions. U.S. Pat. No. 3,965,032 relates to the use of polymers III as dispersants in aqueous polymer dispersions. However, the disadvantage of the polymers III of EP-A 629650 is that they may not be completely satisfactory when used as aids in the drying of aqueous polymer dispersions.

It is an object of the present invention to provide the use of aids which are more suitable for drying aqueous polymer dispersions. Therefore this object is achieved by the use of polymers I which is defined at the outset.

Polymers I and processes for their preparation in a very wide range of molecular weights are generally known.

JP-A 2/173108 describes, for example, the preparation of homo- and copolymers of 2-acrylamido-2-methylpropanesulfonic acid and salts thereof. As potential use for these polymers, JP-A 2/173108 envisages only their use as dispersants for inorganic materials in an aqueous medium.

U.S. Pat. No. 5,294,686 discloses a process for the preparation of low molecular weight 2-acrylamido-2-methylpropanesulfonic acid polymers and the use thereof as dispersants and corrosion inhibitors.

JP-A 6/122842 relates to the preparation of polymers I and the use thereof as additives in underwater antifouling compositions.

U.S. Pat. No. 3,936,400 recommends low-molecular weight 2-acrylamido-2-methylpropanesulfonic acid polymers as viscosity regulators in oil production.

AU-A 35611/84 relates to water-soluble polymers which contain carboxyl, sulfate or sulfonic acid groups and are terminated by —OH, —COOH or $C_{1-3}$alkyl groups. These polymers are recommended as dispersants for particulate materials.

EP-A 123329 recommends, inter alia, copolymers of acrylic acid and 2-acrylamido-2-methylpropanesulfonic acid as dispersants in aqueous pigment dispersions.

U.S. Pat. No. 4,698,161 discloses the use of a mixture of two polymers for dispersing a material consisting of particles. One of the polymers of the mixture is polyacrylic acid and the other is poly-2-acryl-amido-2-methylpropanesulfonic acid.

DE-A 3232811 relates to the preparation of microcapsules having polyurea capsule walls in the presence of special sulfur-con-taining polymers. Among polymers of this type which are used are homopolymers of 2-acrylamido-2-methylpropanesulfonic acid having a relative molecular weight of 5000 to $10^7$.

EP-A 511520 recommends, inter alia, the use of polymers I as dispersants for the preparation of emulsifier-free aqueous polymer dispersions.

Polymers I to be used according to the invention preferably contain copolymerized units, monomers a in which $R^1$, $R^2$, $R^3$, independent of one another, are each H or $CH_3$. Monomers a in which X is NH are also advantageous. $R^4$ is advantageously $C_1$- to $C_3$-alkylene. A very particularly preferably used monomer a is 2-acrylamido-2-methylpropanesulfonic acid (or a salt thereof), ie. the monomer of the general formula I in which $R^1$ is H, $R^2$ and $R^3$ are each $CH_3$, $R^4$ is —$CH_2$— and X is NH.

Suitable monomers a in salt form are in particular alkali metal (e.g. Li, Na or K) and alkaline earth metal (Ca or Mg) salts, as well as salts which are obtainable by neutralizing the free acid by means of organic amines or ammonia. Polymers I suitable according to the invention are thus, for example, those which contain at least 85, or at least 90, or at least 95, or 100% by weight of monomers a as polymerized units.

Suitable monomers b are all monomers which differ from the monomers a and are capable of free radical polymerization. These are, for example, monoethylenically unsaturated monomers, such as olefins, e.g. ethylene or propylene, vinylaromatic monomers, such as styrene, α-methylstyrene, o-chlorostyrene or vinyltoluene, esters of vinyl alcohol and monocarboxylic acids of 1 to 18 carbon atoms, such as vinyl acetate, vinyl propionate, vinyl n-butyrate, vinyl laurate and vinyl stearate, esters of α, β-monoethylenically unsaturated mono- and dicarboxylic acids of preferably 3 to 6 carbon atoms, such as acrylic acid, methacrylic acid, fumaric acid and itaconic acid, with alconols of in general 1 to 12, frequently 1 to 8, in most cases 1 to 4, carbon atoms, in particular methyl, ethyl, n-butyl, iso-butyl, tert-butyl, and 2-ethylhexyl acrylate or methacrylate, dimethyl maleate or n-butyl maleate, the nitriles of the abovementioned α,β-monoethylenically unsaturated carboxylic acids, such as acrylnitrile, and contributed $C_{4-8}$-dienes, such as 1,3-butadiene and isoprene. Further suitable monomers b are α,β monoethylenically unsaturated mono- and dicarboxylic acids of 3 to 6 carbon atoms and the amides thereof, e.g. acrylic acid, methacrylic acid, maleic acid, fumaric acid, itaconic acid, acrylamide and methacrylamide, the monoesters of these carboxylic acids with polyhydric alcohols, such as hydroxyethyl acrylate or hydroxy propyl acrylate, and vinylsulfonic acid and N-vinylpyrrolidone.

If the polymer I to be used according to the invention does not contain monomer b as polymerized units, it will as a rule be a homopolymer of a monomer I, for example of 2-acrylamido-2-methylpropansulfonic acid or one of its salts. The weight average relative molecular weight $\overline{M}_w$ of polymers I to be used according to the invention (based on the fully neutralized sodium salt form) may be, for example from 100 to $10^6$, or from 2000 to $5 \cdot 10^5$ or from 5000 to $10^5$ or from 1000 to 45,000 or from 7500 to 35,000 or from 10,000 to 25,000.

In the case of the generally water-soluble sodium salts of the polymers I, the abovementioned data are based on a molecular weight determination by the gel permeation chromatography method using four columns connected in series:

1. Internal diameter:7.8 mm, Length:30 cm, Separation material:Toso Hass TSK PW-XL 5000,
2. Internal diameter:7.8 mm, Length:30 cm, Separation material:Waters Ultrahydrogel 1000,
3. Internal diameter:7.8 mm, Length:30 cm, Separation material:Waters Ultrahydrogel 500,
4. Internal diameter:7.8 mm, Length:30 cm, Separation material:Waters Ultrahydrogel 500.

200 µl of an 0.1% strength by weight aqueous solution of the polymer I neutralized with sodium hydroxide are added to the column. The columns are heated at 35° C. The eluent used is an aqueous 0.08 molar solution of a TRIS-Buffer (pH 7) to which 0.15 mol/l of NaCl or 0.01 mol/l of $NaN_3$ is added. The flow rate of the eluent is chosen as 0.5 ml/min. Before the application of the sample, the latter is filtered through a Sartorius Minisart RC 25 filter (pore size 0.20 µm). The detector used is a differential refractometer ERC 7510 from ERMA. The calibrations are carried out according to R. Brüssau et al. in Tenside, Surf. Det.28 (1991) 396–406. Relative molecular weight <700 are not taken into account in the abovementioned method of determination.

As stated above, the preparation of polymers to be used according to the invention is known per se. This is advantageously carried out by free radical polymerization. This is preferably effected in polar solvents, in particular in water. Suitable monomers a are both the free acids and salts thereof which are water-soluble in the appropriate amount. Mixtures thereof can of course also be used. Molecular weight regulators may be present for establishing the desired molecular weight. Suitable molecular weight regulators are compounds which have a thiol group (e.g. tert-dodecyl or n-dodecyl mercaptan).

Suitable initiators are inorganic peroxides, such as sodium peroxide sulfates. The polymerization can be carried out as a solution or emulsion polymerization, depending on the monomer composition. The ratio of weight average molecular weight $\overline{M}_w$ to number average molecular weight $\overline{M}_n$ of the polymers I to be used according to the invention can be from 1 to 30 or from 1 to 20 or from 1 to 8, ie. the molecular weight may be distributed essentially uniformly or over a certain width.

It is advantageous if at least 1 g of the polymers I to be used according to the invention dissolves in 100 g of water at 25° C. and 1 bar. This is generally the case. Frequently, the solubility of said polymers I in 100 g of water under the abovementioned conditions is at least 10 g.

If the preparation of the redispersible polymer powder is carried out by the spray drying method, the polymer to be used according to the invention is generally chosen so that its glass transition temperature (midpoint temperature, ASTM D 3418-82) is above the glass transition temperature of the polymer II of the aqueous polymer dispersion to be spray dried.

It is particularly advantageous to carry out the spray drying of an aqueous polymer dispersion at an inlet temperature $T_E$ of the warm air stream of from 100 to 200° C., preferably from 120 to 160° C., and an outlet temperature $T_A$ of the warm air stream of from 30 to 90° C., preferably from 50 to 70° C. Spraying the aqueous polymer dispersion in the warm air stream can be effected, for example, by means of single-material nozzles or multi-material nozzles or a rotating disc. The polymer powders are usually separated off using cyclones or filter separators. The sprayed aqueous polymer dispersion and the warm air stream are preferably fed in parallel.

Against this background, preferred spray assistants are polymers I whose glass transition temperature fulfils the condition $>T_A$. Our own investigations have shown that, for molecular weights which are not too low, the glass transition temperatures of homopolymers of the monomer a are above 100° C.

The polymer I to be used according to the invention may be added as an aqueous solution or as an aqueous dispersion directly to the aqueous dispersion of the polymer II, which dispersion is to be dried. In the case of an aqueous solution of the polymer I, the aqueous dispersion of the polymer II is preferably stirred into the aqueous solution of the polymer I.

It is surprising that the addition of polymers I in amounts of from 1 or 2 to 5% by weight, based on the amount of polymer II contained in the dispersion to be dried, is sufficient to give good redispersibility of the polymer powder obtained by drying.

It is of course also possible to employ the polymers I to be used according to the invention in amounts of from 1 to 10% by weight or from 5 to 40% by weight or more, or in amounts of from 10 to 20% by weight, on the same basis as above.

The novel use of polymers I proves particularly advantageous in the case of polymers II whose glass transition temperature is $\leq 50°$ C. oder $\leq 25°$ C. or $\leq 0°$ C. As a rule, the glass transition temperature of the polymers II is $\geq -60°$ C., or $\geq -40°$ C. or $\geq -20°$ C. Furthermore, the novel use of polymers I proves particularly advantageous in the case of those polymers II which, in polymerized form, are composed of A) from 80 to 100% by weight of at least one monomer selected from the group consisting of styrene, α-methyl stryene, vinyltoluenes, esters of α,β-monoethylenically unsaturated carboxylic acids of 3 to 6 carbon atoms and alkanols of 1 to 12 carbon atoms, butadiene and vinyl and allyl esters of carboxylic acids of 1 to 12 carbon atoms and B) from 0 to 20% by weight of other monomers having at least one ethylenically unsaturated group (such polymers II are defined below as polymers II*), ie. possible monomers A are n-butyl acrylate, 2-ethylhexyl acrylate, methyl methacrylate and styrene.

Possible monomers B are acrylamide, methacrylamide, acrylic acid, methacrylic acid, acrylnitril, methanitril, 2-acrylamido-2-methylpropanesulfonic acid, vinylpyrrolidone, hydroxyethyl acrylate, hydroxymethyl acrylate, hydroxypropyl acrylate, hydroxypropyl methacrylate, quaternized vinylimidazole, N,N-dialkylaminoalkyl (meth)acrylates, N,N-dialkylaminoalkyl (meth)acrylamides, trialkylammoniumalkyl (meth)acrylate and trialkylammoniumalkyl (meth)acrylamides.

Of course, the polymer dispersion to be dried may be a secondary dispersion of a polymer II. In this case, the polymer II is prepared, for example, in a manner known per se with a free radical solution polymerization method and subsequently converted into an aqueous polymer disperson. In this case, the polymer I is preferably added to the prepared aqueous polymer dispersion containing the polymer II in dispersed form.

If the aqueous polymer dispersion comprising polymer II is a primary dispersion, ie. a polymer dispersion which is prepared by the free radical aqueous emulsion polymerization method directly as a disperse phase, the polymer I to be used according to the invention can be added as a drying assistant before, during and/or after the emulsion polymerization of the monomers constituting the polymer II.

This means that, as a rule, the polymer I is added to an aqueous dispersion of the polymer II which already contains dispersant (usually in amounts up to 3% by weight, based on the amount of the polymer II). Suitable dispersants are the conventionally used protective colloids and emulsifiers, as stated, for example, in DE-A 4 21 39 65. The stabilizing effect of protective colloids is due primarily to steric and/or electrostatic shielding of the dispersed polymer particles. As a rule, these are substances whose molecular weight is above 1500. They can be bonded both chemically and physically to the dispersed polymer particles. The stabilizing effect of emulsifiers whose relative molecular weight is usually <1000 is due to the fact that they have an amphiphilic structure (polar part and non polar part) and are therefore capable of reducing the interfacial tension at the interface between polymer and aqueous dispersing medium. In contrast to protective colloids, emulsifiers are capable of forming micells in water. Furthermore, they have the characteristic that, when added to water at 25° C. and 1 atm, they reduce the surface tension by at least 25% on reaching the critical micell formation concentration.

Very important according to the invention is the fact that in particular polymers I to be used according to the invention (especially if they do not contain monomer b as polymerized units) whose weight average relative molecular weight is from 5000 to 35,000, preferably from 7500 to 20,000 or 15,000 not only are drying assistants which can be used according to the invention but are also capable of stabilizing in an excellent manner the disperse phase of an aqueous polymer dispersions, ie. if such polymers I to be used according to the invention are added in the course of the free radical aqueous emulsion polymerization, it is possible on the one hand to produce an aqueous polymer dispersion of polymers II whose emulsifier content is $\leq 2$, or $\leq 1$ or $\leq 0,5$ or $\leq 0.1$ or 0% by weight, based on the amount of dispersed polymer II (the presence of emulsifiers is frequently undesirable since they generally make the films of the aqueous polymer dispersion sensitive to the action of water or, owing to their low molecular weight, are generally exuded from the film) and which, on the other hand, can simultaneously be dried in an excellent manner to give redispersible polymer powders. It is not necessary for the aqueous dispersion of polymer II also to contain added protective colloids of another type in the course of their preparation, in addition to polymers I. Rather, the content of protective colloids differing from polymers I may also be $\leq 5$ or $\leq 3$ or 0% by weight, based on the amount of polymer II present.

It is particularly noteworthy that the use, as described above, of such low molecular weight polymers I also permits the production of stable finely divided (weight average polymer particle diameter $\leq 500$ nm, frequently $\leq 200$ nm and $\geq 50$ nm) aqueous polymer dispersions of polymers II.

It is noteworthy that the use of from $\geq 1$ to $\leq 10\%$ by weight, based on polymer II to be dispersed, of low molecular weight polymers I is sufficient in this context, particularly when polymer I is a low molecular weight poly-2-acrylamido-2-methylpropanesulfonic acid (it is course also possible to use up to 25 or up to 50% by weight, on a corresponding basis). This state of affairs is surprising even in view of the prior art recommendation to use low molecular weight polymers I as dispersants for finely divided inorganic materials. As shown in the illustrative embodiments, a dispersing action in the case of finely divided inorganic materials cannot usually be taken to imply such an action in the preparation of aqueous polymer dispersions by the free radical aqueous emulsion polymerization method.

The monomer composition of the polymer II is essentially unimportant with regard to the abovementioned contexts. The same applies to the type of any emulsifiers and protective colloids present and to the type of polymerization initiators used ie. the abovementioned contexts also apply, for example in the case of those polymers II which contain less than 70% by weight of styrene as polymerized units.

In other words, monomers present in polymer II which have at least one ethylenically unsaturated group and are suitable in the abovementioned context include monoethylenically unsaturated monomers such as olefins, e.g. ethylene, vinylaromatic monomers, such as styrene, α-methylstyrene, o-chlorostyrene, or vinyltoluenes, vinyl and vinylidene halides, such as vinyl and vinylidene chloride, esters of vinyl alcohol and monocarboxylic acids of 1 to 18 carbon atoms, such as vinyl acetate, vinyl propionate, vinyl n-butyrate, vinyl laureate and vinyl stearate, esters of α,β-monoethylenically unsaturated mono- and dicarboxylic acids having preferably 3 to 6 carbon atoms, in particular acrylic acid, methacrylic acid, maleic acid, fumaric acid and itaconic acid, with alkanols of in general 1 to 12, preferably 1 to 8 and in particular 1 to 4, carbon atoms, in particular methyl, ethyl, n-butyl, iso-butyl and 2-ethylhexyl acrylate and methacrylate, dimethyl maleate or n-butylmaleate, nitriles of α, β-mono-ethylenically unsaturated carboxylic acids, such as acrylonitrile, and conjugated $C_{4-8}$-dienes, such as 1,3-butadiene and isoprene. The stated monomers are as a rule the main monomers, which together usually account for more than 50% by weight, based on the total amount of the monomers to be polymerized by the free radical aqueous emulsion polymerization method. Monomers which, when polymerized by themselves, usually give homopolymers which have high water solubility are usually copolymerized only as modifying monomers in amounts of less than 50, as a rule from 0.5 to 20, preferably from 1 to 10% by weight, based on the total amount of the monomers to be polymerized.

Examples of such monomers are α,β-monoethylenically unsaturated mono- and dicarboxylic acids of 3 to 6 carbon atoms and amides thereof, e.g. acrylic acid, methacrylic acid, maleic acid, fumaric acid, itaconic acid, acrylamide and methacrylamide, and vinylsulfonic acid and the water soluble salts thereof and N-vinylpyrrolidone. Monomers which usually increase the internal strength of the films of the aqueous polymer dispersion are copolymerized as a rule likewise only in minor amounts, generally from 0.5 to 10% by weight, based on the total amount of the monomers to be polymerized. Usually, such monomers have an epoxy, hydroxy, N-methylol or carbonyl group or at least two nonconjugated ethylenically unsaturated double bonds. Examples of these are N-alkylolamides of α,β-monoethylenically unsaturated carboxylic acids of 3 to 10 carbon atoms and esters thereof with alcohols of 1 to 4 carbon atoms, among which N-methylolacrylamide, N-methylolmethacrylamide are very particularly preferred, monomers having two vinyl radicals, monomers having two vinylidene radicals and monomers having two alkenyl radicals. The diesters of dihydric alcohols with α,β-monoethylenically unsaturated monocarboxylic acids are particularly suitable, among which in turn acrylic and methacrylic acids are preferably used. Examples of such monomers having two nonconjugated ethylenically unsaturated double bonds are alkylene glycol diacrylates and dimethacrylates, such as ethylene glycol diacrylate, 1,3-butylene glycol diacrylate, 1,4-butylene glycol diacrylate, and propylene glycol diacrylate, divinyl benzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. Also of particular importance in this context are the hydroxy-$C_r$-$C_8$-alkyl methacrylates and acrylates, such as hydroxyethyl, n-hydroxypropyl or n-hydroxybutyl acrylate and methacrylate, and compounds such as diacetone acrylamide and acetylacetoxyethyl acrylate and methacrylate. In addition to monomers having unsaturated double bonds, molecular weight regulators, such as tert-dodecyl mercaptan or 3-mercaptopropyltrimethoxysilane may be copolymerized in minor amounts, usually from 0.01 to 2% by weight, based on the monomers to be polymerized. Such substances are preferably added to the polymerization zone as a mixture with the monomers to be polymerized.

The particular suitability of the low molecular weight polymers I as essentially the sole dispersant in the preparation of polymers II by free radical aqueous emulsion polymerization is especially applicable in the case of polymers II*.

In other words, the novel use of polymers I, facilitate in particular both the preparation of emulsifier-free aqueous polymer dispersions and the preparation of emulsifier-free polymer powders redispersible in water. It is noteworthy that such essentially emulsifier-free aqueous polymer dispersions are characterized by a reduced viscosity.

The monomer feed method is preferably used for carrying out the free radical emulsion polymerization for the preparation of aqueous dispersions of polymers II whose disperse phase is stabilized essentially by means of polymers I. The total amount of the polymer I to be used as a protective colloid can then be either initially taken in the polymerization vessel or continuously fed into the polymerization vessel together with the monomers to be polymerized.

It is to be pointed out that, in addition to the polymers I to be used according to the invention, drying assistants known per se (e.g. polyvinyl alcohol, polyvinylpyrrolidone, naphthalenesulfonic acid (or phenolsulfonic acid)/formaldehyde condensates, etc) may be concomitantly used according to the invention. The same applies to anticaking agents, such as finely divided silica, which are frequently also present during spray drying in order to prevent caking of the polymer powder during storage.

The polymer powders obtained in the case of the use according to the invention are suitable as binders in hydraulically setting materials, paints, finishes, adhesives, coating materials (in particular for paper) and synthetic resin renders, as described in EP-A 629650. The same applies to the starting dispersions used for the powder preparation. Their solids volume content may be from 10 to 75, frequently from 20 to 65, in general from 30 to 50% by weight, based on the volume of the polymer dispersion.

Finally, it should be stated that, when an aqueous solution or dispersion of polymer I is combined with an aqueous dispersion of polymer II, it must be ensured that they are compatible, ie. no anionic polymer I system should be added in the case of a cationically stabilized aqueous dispersion of a polymer II.

EXAMPLES a) Preparation of a polymer I to be used according to the invention (EPI1)

The polymerization was carried out under an inert gas atmosphere. First, 820 g of water were initially taken in a polymerization vessel and heated to 85° C. While maintaining this temperature, 10% by weight of a solution of 17.6 g of sodium peroxide sulfate in 150 g of water were added and stirring was carried out for 5 minutes. Thereafter, while maintaining the temperature of 85° C., the remaining amount of the sodium peroxide sulfate solution and, spatially separated therefrom, a mixture of 800 g of water, 400 g of 2-acrylamido-2-methyl propanesulfonic acid, 400 g of a 25% strength by weight aqueous sodium hydroxide solution and 0.04 g of 4-methoxy-phenol (polymerization inhibitor) were added continuously to the polymerization vessel in the course of 1 hour while stirring (both feeds beginning at the same time). The reaction mixture was then stirred at 85° C. for a further hour. Thereafter, it was cooled to 60° C. and a solution of 7.5 g of sodium hydroxymethane sulfinate and 30 g of water was added in the course of 1 hour while stirring (to eliminate the remaining peroxide).

The resulting clear solution had a solids content of 19.7% by weight and a pH of 12.8. The weight average relative molecular weight of the dissolved polymer EPI1 was determined as 10,000.

b) Preparation of a comparative polymer I (VPI) recommended in EP-A 629650 (Example 1, DPIa) as a spray assistant The polymerization was carried out under an inert gas atmosphere. A solution of 1.76 g of sodium peroxide disulfate in 1050 g of water was initially taken in a polymerization vessel and heated to the polymerization temperature of 85° C. Thereafter, feeds I to III were added synchronously to the polymerization vessel in the course of 2 hours, beginning at the same time, while maintaining the polymerization temperature. The reaction mixture was then left alone for 1 hour at 85° C. Thereafter, 3 g of a 20% strength by weight aqueous solution of the sodium salt of hydroxymethanesulfinic acid were added and the mixture was cooled to room temperature.

| Feed I:   | 280 g of methyl methacrylate and 1 g of the ester of thioglycolic acid and 2-ethylhexanol; |
|-----------|----|
| Feed II:  | 120 g of 2-acrylamido-2-methylpropanesulfonic acid, 400 g of water and 150 g of 20% strength by weight of aqueous sodium hydroxide solution, |
| Feed III: | 15.84 g of sodium peroxide disulfate and 150 g of water. |

The solids content of the resulting aqueous polymer dispersion was 20% by weight.

c) Preparation of spray-dried aqueous standard dispersions of polymers II (SDII1 to SDII4)

SDII1: Corresponds to Example 2, DPIIa of EP-A 629650
A solution of 294 g of water
7.7 g of 10% strength by weight aqueous formic acid solution,
6.6 g of a 20% strength by weight aqueous solution of polyacrylamide,
3.3 g of sodium bicarbonate
11 g of a 20% strength by weight aqueous solution of ethoxylated p-isooctylphenol (degree of ethoxylation: 25) = emulsifier solution 1 and
0.9 g of a 35% strength by weight aqueous solution of the sodium salt of the sulfuric half-ester of ethoxylated p-isooctylphenol (degree of ethoxylation: 25) = emulsifier solution 2 was initially taken in a polymerization vessel and heated to the polymerization temperature of 90° C. Thereafter, feed I was added continuously to the polymerization vessel in the course of 2 hours and feed II in the course of 2.5 hours, beginning at the same time, while maintaining the polymerization temperature. The polymerization vessel was then left alone for a further 2 hours at 90° C. Thereafter, the mixture was cooled to room temperature and was neutralized with 5.5 g of a 20% strength by weight aqueous calcium hydroxide suspension. The solids content of the resulting aqueous polymer dispersion SDII1 was 54.7% by weight. The dispersed polymer had a glass solution temperature of −1° C.

Feed I:

682 g of n-butyl acrylate
385 g of styrene
44 g of a 50% strength by weight aqueous solution of acrylamide,
73.3 g of a 15% strength by weight aqueous solution methacrylamide,
16.5 g of emulsifier solution 1,
22.6 g of emulsifier solution 2, and
235 g of water.

Feed II:

6.4 g of sodium peroxide disulfate in
180 g of water.

SDII2: Corresponds to Example 2, DPIIb of EP-A 629650
A mixture of 500 g of water,
2.5 g of sodium acetate,
2.5 g of butenol and
10 g of an ethoxylated cellulose (Natrosol ® 250 GR)

was heated to the polymerization temperature of 80° C. in a polymerization vessel. Thereafter, first 150 g of feed I was introduced into the polymerization vessel all at once, followed by 10 g of feed II, and polymerization was carried out for 20 minutes at 80° C. The remaining amount of feed I was then metered in continuously in the course of 3 hours and, beginning at the same time, the remaining amount of feed II was fed in continuously in the course of 3.5 hours, while maintaining the temperature of 80° C. Stirring was then carried out for a further hour at 80° C. and finally the mixture was cooled to room temperature.

The solids content of the resulting aqueous polymer dispertion SDII2 was 50.2% by weight. The dispersed polymer had a glass transition temperature of −2° C.

Feed I:

600 g of vinyl propionate,
200 g of tert-butyl acrylate,
200 g of n-butylacrylate,
160 g of a mixture of 150 g of emulsifier solution 1 and 10 g of a block copolymer of ethylene oxide and propylene oxide (EO:PO molar ratio = 0.7 and the relative number average molecular weight = 3200) and
343 g of water;

Feed II:

5 g of sodium peroxide disulfate in
100 g of water.

SDII3: Corresponds to Example 3, DPIIc of EP-A 629650

A solution of 6000 g of water and
17 g of 45% strength by weight aqueous solution of the surfactant corresponding to Dowfax ® 2A1 was heated to the polymerization temperature of 80° C. in a polymerization vessel. Thereafter, 1087 g of feed I and 108 g of feed II were added to the polymerization vessel all at once in succession and polymerization was carried out for 30 minutes at 80° C. The remaining amounts of the feeds I and II were then added continuously in the course of 3.5 hours, beginning at the same time, while maintaining the polymerization temperature. The reaction mixture was then left alone for 4 hours at 80° C. Finally, it was cooled to room temperature and neutralized with 420 g of 25% strength by weight aqueous sodium hydroxide solution. The solids content of the resulting aqueous polymer dispersion SDII3 was 50.9% by weight. The dispersed polymer had a glass transition temperature of 60° C.

Feed I:

12150 g of styrene,
2250 g of butadiene,
450 g of 50% strength aqueous solution of acrylamide,
375 g of acrylic acid,
120 g of tert-dodecyl mercaptan,
117 g of a 45% strength by weight aqueous solution of the surfactant corresponding to Dowfax 2A1,
250 g of a 15% strength by weight aqueous solution of the sodium salt of the sulfuric acid half-ester of lauryl alcohol and
6033 g of water.

Feed II:

150 g of sodium peroxide disulfate and
200 g of water.

SDII4

As for SDII1, except that the 385 g of styrene were replaced by 385 g of methyl methacrylate. After filtration, a dispersion SDII4 having a solids content of 55.6% by weight was obtained. The dispersed polymer had a glass transition temperature of 0°0 C.

d) Spray-drying of the aqueous polymer dispersions from c) and evaluation of the redispersibility of the resulting powders First, the particular aqueous polymer dispersion SDII1 to SDII4 was diluted to a solids content of 36.2% by weight. The particular polymer dispersion SDII1 to SDII4 diluted to 36.2% by weight was then rapidly stirred into the aqueous solution of EPI1 from a) or into the aqueous dispersion of VPI from a) with vigorous stirring in an amount such that the resulting aqueous mixture had a solids content of 35% by weight (based on the particular dispersed polymer II, 4.5% by weight of EPI1 or VP1 were thus always present).

The spray drying of the aqueous mixtures was carried out in a Minor laboratory dryer from GEA Wiegand GmbH (Niro Division), Germany, with atomization by means of a binary nozzle, at a tower inlet temperature of 130° C. and a tower outlet temperature of 60° C. (rate: about 2 kg of spray feed/h). About 2.5% by weight (based on solid polymer mixture) of a finely divided silica (average maximum particle diameter 10 μm) were metered into the drying chamber as an antiblocking agent, simultaneously with the spray feed. The evaluation of the particular spray drying is shown in Table 1.

The following procedure was adopted for checking the redispersibility of the polymer powders obtained:

90 g of water were weighed into a glass bottle and 10 g of polymer powder were added at 25° C. The mixture was stirred with an Ultra-Turrax 1 from Janke & Kunkel, IKA-Labortechnik, Staufen, Germany for 1 minute at 9500 rpm and was introduced into a measuring cylinder. The measuring cylinder closed by means of a plastic stopper was then stored without agitation at 25° C. for 72 hours. The redispersion was then thoroughly shaken and filtered through a 72 μm sieve. The sieve containing the filter cake was stored at 80° C. for 12 hours in a drying oven and the percentage by weight, based on the amount of powder used (10 g), of the dried coagulum was then determined by weighing. The results are likewise shown in Table 1.

TABLE 1

| Spray-dried mixture | | | | |
|---|---|---|---|---|
| Dispersion | spray assistant | Wall deposit | Powder yield | Coagulum |
| SDII1 | EPI1 | little | 86% | 0.5% by weight |
| SDII2 | EPI1 | little | 74% | 1.4% by weight |
| SDII3 | EPI1 | little | 63% | 2.2% by weight |
| SDII4 | EPI1 | little | 89% | 0,7% by weight |
| SDII1 | VPI1 | pronounced | 30% | 7.1% by weight | e) Preparation of aqueous dispersions of polymers II which contain a low molecular weight novel polymer I as essentially the only dispersant, the spray drying of such aqueous polymer dispersions and comparitive experiments

D1

200 g of n-butyl acrylate, 200 g of methyl methacrylate and 91.4 g of the 19.7% strength by weight aqueous solution of polymer EPI1 from a) were emulsified in 114 g of water to give a feed 1. 12 g of sodium peroxide disulfate and 159 g of water formed feed 2.

200 g of water and 5% by weight of feed 1 were initially taken under an inert gas atmosphere in a polymerization vessel. The initially taken mixture was heated to 90° C. while stirring, and 10% by weight of feed 2 was added. The reaction mixture was then kept at 90° C. for 15 minutes. Thereafter, while maintaining the temperature of 90° C., the remaining amount of feed 1 was added continuously to the polymerization vessel in the course of 2 hours and the remaining amount of feed 2 was added in the course of 2.5 hours. After the end of the feeds, the reaction mixture was stirred for a further 2 hours at 90° C. and then cooled to room temperature. The aqueous polymer dispersion obtained after filtration through a sieve having a mesh size of 250 μm had a solids content of 43.6% by weight and a light transmittance of 6% (the light transmittance is a measure of the polymer particle size of an aqueous polymer dispersion; it gives the light transmittance at 25° C. in the state diluted to a solids content of 0.01% by weight, relative to pure water and with a path length of 2.5 cm, with incident white light) and its aqueous dispersing medium had a pH of 1.9. 0.2 g of coagulum remained in the filter. A wet film applied in a layer thickness of 60 μm on a glass sheet by means of a knife coater exhibited essentially no specks (microcoagulum).

D2

As for D1, except that feed 1 consisted of an emulsion of 208 g of n-butyl acrylate, 180 g of methyl methacrylate, 8 g of acrylamide, 4 g of acrylic acid and 91.4 g of the 19.7% strength by weight aqueous solution of polymer EPI1 from a) in 114 g of water. The dispersion obtained after filtration through a sieve having a mesh size of 250 μm had a solids content of 43.9% by weight and a light transmittance of 52% and its aqueous dispersing medium had a pH of 4.3. 0.2 g of coagulum remained in the filter. A wet film applied in a layer thickness of 60 μm on a glass sheet by means of a knife coater exhibited essentially no specks.

D3

As for D1, except that feed 1 consisted of an emulsion of 248 g of n-butyl acrylate, 140 g of styrene, 8 g of acrylamide, 4 g of methacrylamide and 91.4 g of the 19.7% strength by weight aqueous solution of polymer EPI1 from a) in 114 g of water. The dispersion obtained after filtration through a sieve having a mesh size of 250 μm had a solids content of 43.3% by weight and a light transmittance of 49% and its aqueous dispersing medium has a pH of 2.1. 0.3 g of coagulum remained in the filter. A wet film applied in a layer thickness of 60 μm on a glass sheet by means of a knife coater exhibited essentially no specks.

D4

A feed 1 was formed from a mixture of 100 g of n-butyl acrylate and 100 g of methyl methacrylate. A solution of 1.0 g of hydrogen peroxide and 100 g of water formed a feed 2. 247 g of water, 1.3 g of a 15% strength by weight aqueous sodium lauryl sulfate solution, 50.8 g of a 19.7% strength by weight aqueous solution of the polymer EPI1 from a), 0.04 g of $CuSO_4.5H_2O$ and 5% by weight of feed 1 were initially taken under an inert gas atmosphere in a polymerization vessel. The initially taken mixture was heated to 85° C. while stirring, and 10% by weight of feed 2 were added. Thereafter, the mixture was kept at 85° C. for 15 minutes while stirring and, while maintaining the temperature of 85° C., the remaining amount of feed 1 was subsequently added continuously to the polymerization vessel in the course of 2 hours and, beginning at the same time, the remaining amount of feed 2 was added in the course of 2.5 hours. After the end of the addition, the polymerization mixture was stirred for a further 2 hours at 85° C. and then cooled to room temperature. The dispersion obtained after filtration through a sieve having a mesh size of 250 μm had a solids content of 34.2% by weight and a light transmittance of 88% and its aqueous dispersion medium had a ph of 6.8. 0.69 g of coagulum remained in the filter. A wet film applied in a layer thickness of 60 μm on a glass sheet by means of a knife coater exhibited essentially no specks.

D5

An emulsion was formed as feed 1 from 155 g of n-butyl acrylate, 87.5 g of styrene, 5 g of acrylamide, 2.5 g of methacrylamide, 190.4 g of the 19.7% strength by weight solution of polymer EPI1 from a) and 20 g of water. A solution of 7.5 g of sodium peroxide disulfate in 100 g of water formed a feed 2. 104 g of water and 5% by weight of feed 1 were initially taken under an inert gas atmosphere in a polymerization vessel. The initially taken mixture was heated to 90° C. while stirring, and 10% by weight of feed 2 were added. The mixture was then kept at 90° C. for 15 minutes while stirring. Thereafter, while maintaining the temperature of 90° C., the remaining amount of feed 1 was added continuously to the polymerization vessel in the course of 2.0 hours and, beginning at the same time, the remaining amount of feed 2 was added in the course of 2.5 hours. The reaction mixture was then stirred for a further 2 hours at 90° C. and finally cooled to room temperature.

The dispersion obtained after filtration through a sieve having a mesh size of 250 μm had a solids content of 43.2% by weight and a light transmittance of 68% and its aqueous dispersing medium has a pH of 2.7. 0.3 g of coagulum remained in the filter. A wet film applied in a layer thickness of 60 μm on a glass sheet by means of a knife coater exhibited essentially no specks.

VD1

As for D1, except that feed 1 consisted of an emulsion of 200 g of n-butyl acrylate, 200 g of methyl methacrylate and 90 g of the 20% strength by weight aqueous dispersion of the polymer VPI from b) in 114 g of water. The dispersion obtained after filtration through a sieve having a mesh size of 250 μm had a solids content of 43.4% by weight and a light transmittance of 30% and its aqueous dispersing medium has a pH of 1.7. 5.8 g of coagulum remained in the filter. A wet film applied in a layer thickness of 60 μm on a glass sheet by means of a knife coater exhibited a large number of specks.

VD2

As for D5, except that 187.5 g of the 20% strength by weight aqueous dispersion of polymer VPI from b) were used instead of the 190.4 g of the 19.7% strength by weight aqueous solution of polymer EPI1 from a). The dispersion obtained after filtration through a seive having a mesh size of 250 μm had a solids content of 42.7% by weight and a light transmittance of 43% and its aqueous dispersing medium had a pH of 2.1. 14 g of coagulum remained in the filter. A wet film applied in a layer thickness of 60 μm on a glass sheet by means of a knife coater exhibited a large number of specks.

VD3

As for D4, except that the initially taken mixture contained a mixture of 247 g of water, 1.3 g of a 15% strength by weight aqueous sodium lauryl sulfate solution, 50 g of a 20% strength by weight aqueous solution, prepared similarly to a), of a poly-2-acrylamido-2-methylpropanesulfonic acid, whose weight average relative molecular weight however was 38,000, 0.04 g of $CuSO_4·5H_2O$ and 5% by weight of feed 1. The reaction mixture thickened as early as during the monomer feed so that the reaction had to be terminated.

VD4

As for D1, except that feed 1 consisted of 200 g of n-butyl acrylate, 200 g of methyl methacrylate, 90 g of 20% strength by weight aqueous poly-2-acrylamido-2-methyl-propanesulfonic acid solution from VD3 and 116 g of water. The batch coagulated after polymerization was complete.

VD5

As for D1, except that feed 1 consisted of 200 g of n-butyl acrylate, 200 g of methyl methacrylate, 71.2 g of a 25.3% strength by weight aqueous solution of Sokalan® CP9 (maleic acid copolymer), which is commercially available as a dispersant for finely divided organic and inorganic solids, and 135 g of water. The batch coagulated after polymerization was complete. This shows that dispersants are not necessarily suitable as protective colloids for finely divided organic and inorganic solids for carrying out free radical aqueous emulsion polymerizations.

The aqueous polymer dispersions D1 to D5 could be dried in a satisfactory manner by the spray drying method described under d) to give redispersible polymer powders.

f) Preparation of further polymers I (EPI2 to EPI6) to be used according to the invention and aqueous dispersions D6 to D10 of polymers II which contain, as essentially the only dispersant, a low molecular weight novel polymer I, and the spray drying of such aqueous polymer dispersions.

1. Preparaton of EPI2 to EPI6

The polymerizations were carried out under an inert gas. First, 810 g of water were initially taken in a polymerization vessel and heated to 85° C. While maintaining this temperature, 10% by weight of a solution of Xg of sodium peroxodisulfate in Yg of water were added and stirring was carried out for 5 minutes. Thereafter, while maintaining the temperature of 85° C., the remaining amount of the sodium peroxodisulfate solutiion and, spatially separated therefrom, a mixture of 800 g of water, 400 g of 2-acrylamido-2-methylpropanesulfonic acid, 400 g of a 25% strength by weight aqueous sodium hydroxide solution and 0.04 g of 4-methoxyphenol were added continuously to the polymerization vessel in the course of 2 hours while stirring (both feeds beginning at the same time). The reaction mixture was then stirred for a further hour at 85° C. and then cooled. The values used for X and Y, the solids contents of the resulting aqueous solutions, the pH of the associated aqueous dispersing media and the weight average relative molecular weight $M_w$ of the polymers EPI2 to EPI6 present in solution are shown in Table 1 below.

TABLE 1

| | X | Y | Solids content (% by weight) | pH | $M_w$ |
|---|---|---|---|---|---|
| EPI2 | 2.4 | 100 | 19.3 | 13.5 | 12300 |
| EPI3 | 5 | 110 | 19.2 | 13.4 | 11400 |
| EPI4 | 10 | 130 | 19.4 | 13.4 | 10000 |
| EPI5 | 20 | 170 | 19.5 | 13.2 | 9600 |
| EPI6 | 40 | 250 | 19.3 | 12.9 | 8500 |

2. Preparation of aqueous dispersions D6 to D10 of polymers II and their spray drying 208 g of n-butyl acrylate, 180 g of methyl methacrylate, 8 g of acrylamide, 4 g of methacrylamide and 18.0 g of one of the polymers EPI2 to EPI6 were emulsified in 187 g of water to give a feed 1, and the resulting emulsion was brought to a pH of 8.0 by means of aqueous 2N $NH_3$ solution. The solution of 12.0 g of sodium peroxidodisulfate in 159 g of water formed feed 2.

200 g of water and 5% by weight of feed 1 were initially taken under an inert gas atmosphere in a polymerization vessel. The initially taken mixture was heated to 90° C. while stirring, and 10% by weight of feed 2 were added. The reaction mixture was then kept at 90° C. for 15 minutes. Thereafter, while maintaining the temperature of 90° C., the remaining amount of feed 1 was added continuously to the polymerization vessel in the course of 2 hours and the remaining amount of feed 2 was added in the course of 2.5 hours. After the end of the feeds, the reaction mixture was stirred for a further 2 hours at 90° C. and then cooled to room temperature. The solids content and light transmittance of the aqueous polymer dispersions obtained after filtration through a sieve having a mesh size of 250 μm, the pH of the aqueous dispersion medium of said dispersions and the coagulum content in the filter were determined. In addition, a wet film of the filtered aqueous polymer dispersions was applied in a layer thickness of 60 μm on a glass sheet by means of a knife coater and the content of specks in said film was qualitatively evaluated. The results obtained are shown in Table II.

TABLE II

| | Polymer I | Solids content % by weight | Light transmittance [%] | Coagulum [g] | Specks | pH |
|---|---|---|---|---|---|---|
| D6 | EPI2 | 43.6 | 52 | 0.2 | essentially none | 4.7 |
| D7 | EPI3 | 43.1 | 53 | 0.5 | essentially none | 4.6 |
| D8 | EPI4 | 43.2 | 42 | 0.7 | essentially none | 4.5 |
| D9 | EPI5 | 43.8 | 34 | 0.6 | essentially none | 4.4 |
| D10 | EPI6 | 43.6 | 45 | 0.5 | essentially none | 4.4 |

The aqueous polymer dispersions D6 to D10 could be dried in a satisfactory manner by the spray drying method described under d) to give redispersible polymer powders.

We claim:

1. A process comprising drying an aqueous dispersion of a polymer II, wherein the aqueous dispersion of the polymer II contains, as added drying assistant, at least one polymer I which, in polymerized form, is composed of from ≧85 to 100% by weight of monomer units of at least one monomer of the formula I and/or salts thereof (monomer a)

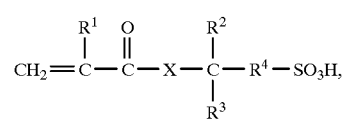

(I)

wherein $R^1$, $R^2$, and $R^3$, independently of one another, are each
   H or $C_1$–$C_3$-alkyl,
   $R^4$ is $C_1$–$C_5$-alkylene and
   X is O or NH, and
   from 0 to ≦15% by weight of monomer units of at least one monomer capable of free radical copolymerization (monomer b).

2. The process as claimed in claim 1, wherein the polymer I, in polymerized form, is composed of from 90 to 100% by weight of monomer a units and from 0 to 10% by weight of monomer b units.

3. The process as claimed in claim 1, wherein the polymer I, in polymerized form, is composed only of monomer a units.

4. The process as claimed in claim 1, wherein the polymer I contains 2-acrylamido-2-methylpropanesulfonic acid or salts thereof as polymerized units.

5. The process as claimed in claim 1, wherein the polymer I, in polymerized form, is composed only of 2-acrylamido-2-methylpropanesulfonic acid or salts thereof.

6. The process as claimed in claim 1, wherein the relative weight average molecular weight of polymer I is from 1000 to $10^6$.

7. The process as claimed in claim 1, wherein the relative weight average molecular weight of polymer I is from 2000 to 45000.

8. The process as claimed in claim 1, wherein the solubility of the polymer I in 100 g of water at 25° C. and 1 bar is at least 10 g.

9. The process as claimed in claim 1, wherein the aqueous dispersion of polymer II contains from 1 to 40% by weight, based on the mass of the polymer II, of added polymer I.

10. The process as claimed in claim 1, wherein the aqueous dispersion of polymer II contains from 1 to 20% by weight, based on the mass of polymer II, of added polymer I.

11. The process as claimed in claim 1, wherein the aqueous dispersion of polymer II contains from 1 to 5% by weight, based on the mass of polymer II, of added polymer I.

12. The process as claimed in claim 1, wherein the glass transition temperature of the polymer II $\leq 50°$ C.

13. The process as claimed in claim 1, wherein the polymer II, in polymerized form, is composed of
   A) from 80 to 100% by weight of monomer units of at least one monomer selected from the group consisting of styrene, α-methylstyrene, vinyltoluenes, esters of α,β-monoethylenically unsaturated carboxylic acids of 3 to 6 carbon atoms and alkanols of 1 to 12 carbon atoms, butadiene and vinyl and allyl esters of carboxylic acids of 1 to 12 carbon atoms and
   B) from 0 to 20% by weight of monomer units of other monomers having at least one ethylenically unsaturated group.

14. The process as claimed in claim 1, which is effected by the spray-drying method.

15. The process as claimed in claim 14, wherein the inlet temperature of a warm air stream is from 100 to 200° C. and the outlet temperature of the warm air stream is from 30 to 90° C.

16. A process comprising adding a polymer I which, in polymerized form is composed of from $\geq 85$ to 100% by weight of monomer units of at least one monomer of the formula I or salts thereof (monomer a)

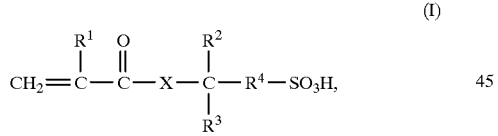

wherein $R^1$, $R^2$, and $R^3$, independently of one another, are each

H or $C_1$–$C_3$-alkyl,
$R^4$ is $C_1$–$C_5$-alkylene and
X is O or NH, and from 0 to $\leq 15\%$ by weight of monomer units of at least one monomer capable of free radical copolymerization (monomer b), as a drying assostant, to an aqueous dispersion of a polymer II differing from polymer I.

17. A polymer powder containing at least one polymer I which, in polymerized form, is composed of
   from $\geq 85$ to 100% by weight of monomer units of at least one monomer of the formula I or salts thereof (monomer a)

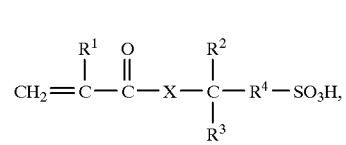

where $R^1$, $R^2$, and $R^3$, independently of one another, are each H
or $C_1$–$C_3$alkyl,
and $R^4$ is $C_1$–$C_5$-alkylene and
X is O or NH,
and from 0 to $\leq 15\%$ by weight of monomer units of at least one monomer capable of free radical copolymerization (monomer b), and at least one polymer II differing from the polymer I, with the proviso that polymer II is dispersible in an aqueous medium.

18. The polymer powder as claimed in claim 17, which contains $\leq 1\%$ by weight, based on the amount of polymer II present, of emulsifiers.

19. A mineral binder containing at least one polymer powder as claimed in claims 17 or 18.

20. A dry synthetic resin render formulation containing at least one polymer powder as claimed in claim 17 or 18.

21. An aqueous polymer dispersion of a polymer II whose emulsifier content is $\leq 2\%$ by weight and which contains, as added dispersant, at least one polymer I which, in polymerized form, is composed of
   from 85 to 100% by weight of monomer units of at least one monomer of the formula I or salts thereof (monomer a)

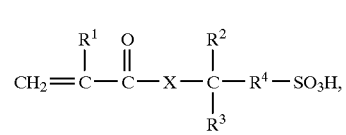

where $R^1$, $R^2$ and $R^3$, independently of one another, are each H
or $C_1$–$C_3$-alkyl,
$R^4$ is $C_1$–$C_5$-alkylene and
X is O or NH, and
from 0 to $\leq 15\%$ by weight of monomer units of at least one monomer capable of free radical copolymerization (monomer b), and has a relative average molecular weight of from 5000 to 35000, with the proviso that polymer II is dispersible in an aqueous medium.

22. An aqueous polymer dispersion as claimed in claim 21, wherein the relative weight average molecular weight of the polymer I is from 7500 to 20,000.

23. An aqueous polymer dispersion as claimed in claim 21 or 22, wherein the polymer I is poly-2-acrylamido-2-methylpropane sulfonic acid.

24. An aqueous polymer dispersion as claimed in claim 21, wherein the polymer I is the only dispersant present.

25. An aqueous polymer dispersion as claimed in claim 21, whose weight average polymer particle diameter is from $\geq 50$ to $\leq 200$ nm.

26. Method of use of an aqueous polymer dispersion as claimed in claim 21 as a binder or as an additive in mineral binders.

27. A process for preparing polymer powders comprising adding a polymer I which, in polymerized form, is composed of from ≧85 to 100% by weight of monomer units of at least one monomer of the formula I or salts thereof (monomer a)

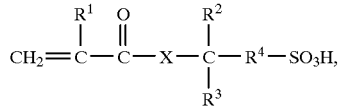
(I)

where $R^1$, $R^2$ and $R^3$, independently of one another, are each H or $C_1$–$C_3$-alkyl,
$R^4$ is $C_1$–$C_5$-alkylene and
X is O or NH, and from 0 to ≦15% to 100% by weight of monomer units of at least one monomer capable of free radical copolymerization (monomer b), as a drying assistant, to an aqueous dispersion of a polymer II differing from polymer I, and drying said aqueous dispersion.

28. The process for the free radical aqueous emulsion polymerization of monomers having at least one ethylenically unsaturated group, wherein a polymer I which, in polymerized form, is composed of from ≧85 to 100% by weight of monomer units of at least one monomer of the formula I or salts thereof (monomer a)

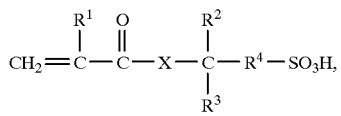
(I)

where $R^1$, $R^2$ and $R^3$, independently of one another, are each
H or $C_1$–$C_3$-alkyl,
$R^4$ is $C_1$–$C_5$-alkylene and
X is O or NH, and from 0 to ≦15% by weight of at least one monomer capable of free radical copolymerization (monomer b), and whose relative weight average molecular weight is from 5000 to 35,000, is added before, during or after the end of the polymerization.

29. A process as claimed in claim 28, wherein the polymer I contains no monomers b as polymerized units.

30. A process as claimed in claim 28 or 29, wherein the polymer I is the only dispersant added during free radical aqueous emulsion polymerization.

31. A polymer powder obtained by the process as claimed in claim 1.

* * * * *